(12) United States Patent
Rupar et al.

(10) Patent No.: US 8,235,269 B2
(45) Date of Patent: Aug. 7, 2012

(54) CARGO SPACE FLOOR HAVING A SKI RACK AND MOTOR VEHICLE HAVING SUCH A CARGO SPACE FLOOR

(75) Inventors: Ernesto Rupar, Frankfurt (DE); Monica Felicio Fragoso, Frankfurt (DE); Andrew Dyson, Eppstein (DE); Christopher Daab, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 694 days.

(21) Appl. No.: 12/349,476

(22) Filed: Jan. 6, 2009

(65) Prior Publication Data
US 2009/0218378 A1  Sep. 3, 2009

(30) Foreign Application Priority Data
Feb. 28, 2008 (DE) .................. 20 2008 002 848 U

(51) Int. Cl.
*B60R 5/04* (2006.01)

(52) U.S. Cl. ........ 224/539; 224/542; 224/549; 224/553; 224/917.5; 296/37.14

(58) Field of Classification Search ............... 224/319, 224/403, 539, 542, 553, 556, 917.5, 549, 224/550; 296/37.14; 211/204, 70.5
See application file for complete search history.

(56) References Cited

U.S. PATENT DOCUMENTS

| | | | |
|---|---|---|---|
| 3,261,521 A * | 7/1966 | Meccico et al. | 224/553 |
| 3,468,460 A * | 9/1969 | Wright et al. | 224/319 |
| 3,610,491 A * | 10/1971 | Bott | 224/321 |
| 3,627,158 A * | 12/1971 | Kobasic | 414/462 |
| 3,695,495 A * | 10/1972 | Parsons | 224/330 |
| 4,330,065 A * | 5/1982 | Haddad | 211/70.5 |
| 4,863,082 A * | 9/1989 | Evans et al. | 224/406 |
| 4,881,673 A | 11/1989 | Kapp | |
| 5,129,563 A * | 7/1992 | Dillon | 224/275 |
| 5,439,152 A * | 8/1995 | Campbell | 224/405 |
| 5,599,054 A * | 2/1997 | Butz et al. | 296/37.8 |
| 5,657,913 A * | 8/1997 | Cucheran et al. | 224/319 |
| 6,015,074 A * | 1/2000 | Snavely et al. | 224/310 |
| 6,918,734 B2 * | 7/2005 | Nick et al. | 414/522 |
| 7,093,873 B2 * | 8/2006 | Nilsrud et al. | 296/37.14 |
| 2005/0189778 A1 | 9/2005 | De Gaillard | |

FOREIGN PATENT DOCUMENTS

| | | |
|---|---|---|
| DE | 10224306 | 12/2002 |
| JP | 2000135988 | 5/2000 |
| WO | 2004041594 A2 | 5/2004 |

OTHER PUBLICATIONS

British Patent Office, British Search Report for Application No. 0902969.5, dated Nov. 30, 2011.

* cited by examiner

*Primary Examiner* — Nathan J Newhouse
*Assistant Examiner* — Steven M Landolfi, Jr.
(74) *Attorney, Agent, or Firm* — Ingrassia Fisher & Lorenz, P.C.

(57) ABSTRACT

A cargo space floor is provided for a motor vehicle and a ski rack is positioned on the cargo space floor that may be pivoted from a lower nonuse position around a first pivot axis into an upper usage position, in which a ski may be fastened to the ski rack. The ski rack has at least one first support strut and one second support strut that are spaced apart from one another and have openings aligned with one another for receiving a ski. A motor vehicle is also provided having such an advantageous cargo space floor.

18 Claims, 3 Drawing Sheets

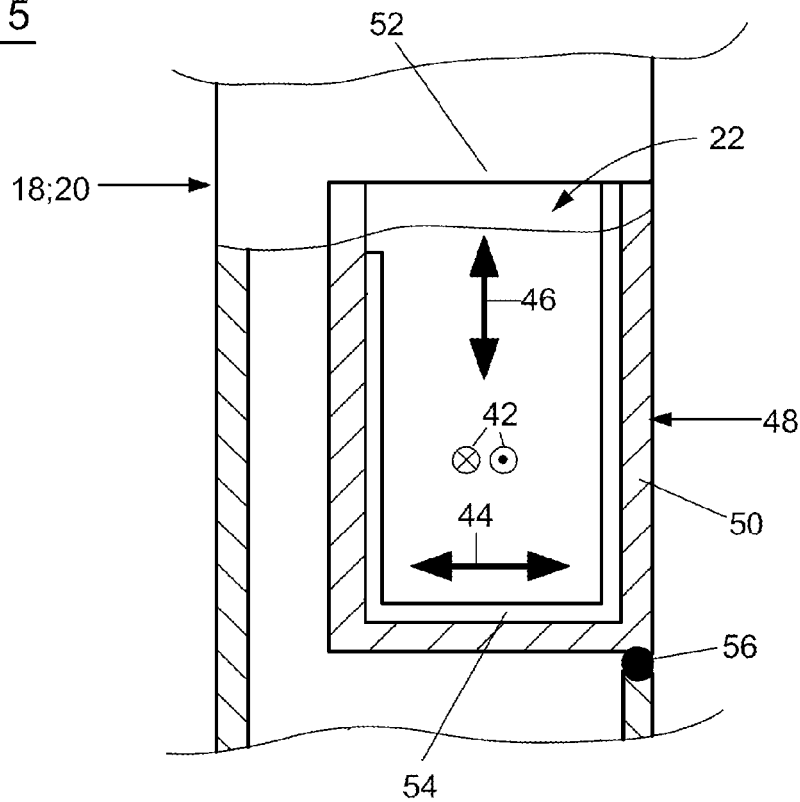
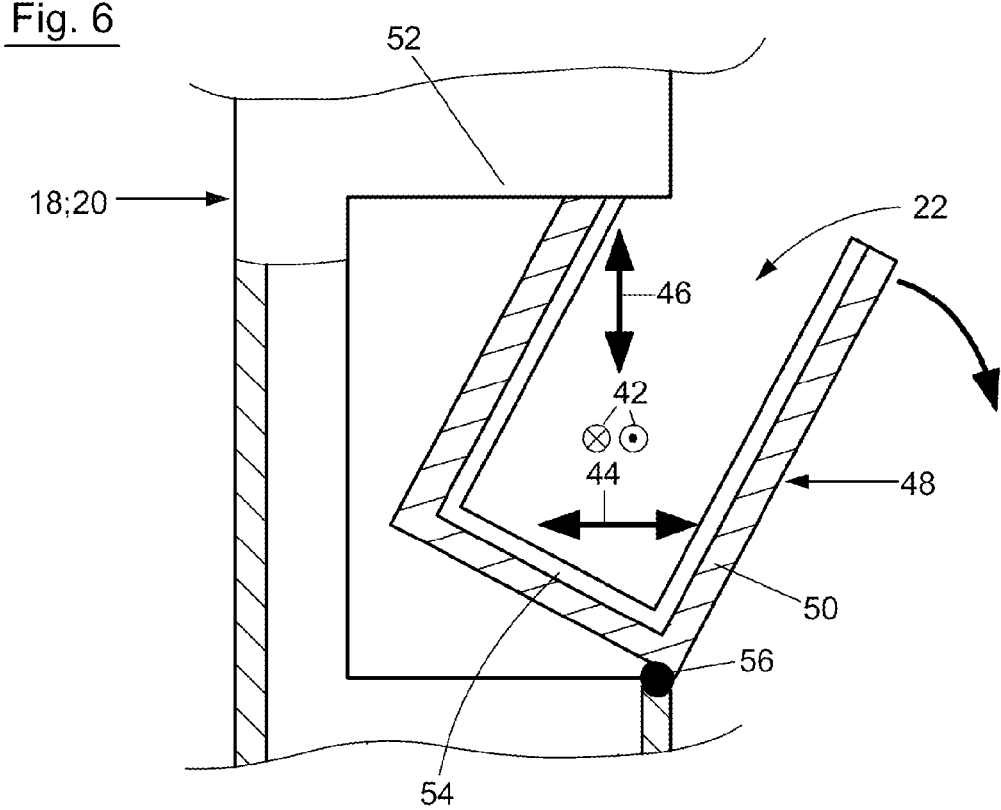

CARGO SPACE FLOOR HAVING A SKI RACK AND MOTOR VEHICLE HAVING SUCH A CARGO SPACE FLOOR

CROSS-REFERENCE TO RELATED APPLICATION

This application claims priority to German Patent Application No. 202008002848.5, filed Feb. 28, 2008, which is incorporated herein by reference in its entirety.

TECHNICAL FIELD

The present invention relates to a cargo space floor for a motor vehicle, a ski rack being situated on the cargo space floor, which may be pivoted from a lower nonuse position around a first pivot axis into an upper usage position, in which a ski may be fastened to the ski rack. Furthermore, the present invention relates to a motor vehicle having such a cargo space floor.

BACKGROUND

A plurality of ski racks for a motor vehicle are known from the prior art, which are or may be attached to the motor vehicle outside the motor vehicle. The ski racks positioned outside the motor vehicle are classically fastened to the roof of the motor vehicle, to subsequently fasten a ski or similar item thereto. However, the ski racks externally attached to the motor vehicle are connected to various disadvantages. Thus, the skis fastened to the external ski rack are subjected to strong weather influences, in addition, unknown persons may access the skis relatively easily, so that optimum theft protection is not ensured. Furthermore, the skis attached to the external ski rack have a negative influence on the aerodynamic properties of the motor vehicle (i.e., both the external ski racks and also the skis fastened thereto increase the driving wind resistance and thus also the fuel consumption of the motor vehicle).

To overcome the above-mentioned disadvantages, recently a transition has recently been made to positioning the ski racks within the motor vehicle. Thus, for example, DE 102 24 306 A1 suggests a ski rack for the interior of a motor vehicle, which is essentially composed of a metal stand, which may be fastened inside the motor vehicle. The metal stand is to be fastened in the motor vehicle in such a manner that the skis may be accommodated in the metal stand at a diagonal position thereof. In this manner, the skis are to be prevented from being positioned directly on the floor of the baggage compartment. However, the known solution has the disadvantage that it makes the handling of the ski rack more difficult and it is not possible to stow it in a space-saving manner.

The disadvantages of the prior art described above are partially overcome by an achievement of the object which is described in JP 2000135988 A. The cited publication discloses a ski rack which is positioned on a stationary cargo space floor of the motor vehicle. The ski rack is essentially composed of a support plate and a pivot mechanism, the support plate being able to be pivoted from a lower nonuse position, in which the support plate is positioned in a recess in the cargo space floor, via the pivot mechanism into an upper usage position, in which the support plate is positioned raised in relation to the cargo space floor. A ski may be fastened from above to the support plate in the usage position of the known ski rack.

The previously described prior art does allow a space-saving configuration of the ski rack in its nonuse position, but the known ski rack occupies a relatively large amount of room inside the cargo space in the usage position, which may then no longer be used for other cargo. In addition, the handling of the known ski rack is made more difficult, and it may have an interfering effect during loading of the cargo space and/or the cargo space floor even in its nonuse position.

It is therefore at least one object of the present invention to provide a cargo space floor having a ski rack, in which the ski rack may be positioned in a space-saving manner within the cargo space both in the nonuse position and also in the usage position thereof. In addition, it is to be ensured that the handling of the ski rack is simplified and simple loading of the cargo space floor is possible when the ski rack is located in the nonuse position. As a supplement thereto, secure and rapid fastening of the ski to the ski rack is to be possible. The present invention is also based on the object of providing a motor vehicle having such an advantageous cargo space floor, rapid and simple fastening of a ski to the ski rack being possible. In addition, other objects, desirable features, and characteristics will become apparent from the subsequent summary and detailed description, and the appended claims, taken in conjunction with the accompanying drawings and this background.

SUMMARY

The cargo space floor according to an embodiment of the invention is conceived for a motor vehicle. A ski rack, which may be pivoted from a lower nonuse position around a first pivot axis into an upper usage position, is positioned on the cargo space floor, which may be implemented as plate-shaped, for example. One or more skis may be fastened to the ski rack in the usage position. According to an embodiment of the invention, the ski rack has at least one first support strut and one second support strut, which are spaced apart from one another and have openings aligned with one another for receiving a ski.

The cargo space floor according to an embodiment of the invention firstly has the advantage that the ski rack fastened thereon only occupies little space within the cargo space when the first and second support struts are pivoted into the usage position. Even if no ski is fastened to the two support struts, these two support struts only occupy a small amount of space in their usage position, so that the support struts may also remain in their usage position if needed, even if no ski is to be transported. In this case, the remaining surface of the cargo space floor may still be used comfortably for placing cargo. The ski rack having its two support struts is also constructed especially simply, so that the handling of the ski rack upon pivoting between the usage position and the nonuse position is simplified.

To simplify the handling of the ski rack further, the pivot movements of the two support struts around the first pivot axis are coupled to one another in a first embodiment of the cargo space floor according to the invention. The operator thus merely has to grasp one of the two support struts and pivot it around the first pivot axis to simultaneously also pivot the other support strut. This is advantageous in particular if one of the two support struts is placed closer to the operator. It is not necessary in this case to lean into the cargo space floor to pivot both support struts.

To achieve especially simple coupling of the pivot movements of the two support struts, the first support strut and the second support strut are connected to one another via a connection strut in a further preferred embodiment of the cargo space floor according to an embodiment of the invention.

According to a further preferred embodiment of the cargo space floor according to the invention, the support struts are implemented jointly with the connection strut as essentially U-shaped. An especially simple construction is implemented in this manner, which allows a space-saving configuration and simple handling.

To simplify the handling of the ski rack further, the connection strut is fastened to the ends of the support struts facing away from the first pivot axis in a further preferred embodiment of the cargo space floor according to the invention. This is advantageous because the operator does not even have to grasp one of the two support struts in order to pivot them. Rather, the operator may grasp the connection strut to pivot both support struts simultaneously around the first pivot axis.

In an especially preferred embodiment of the cargo space floor according to the invention, the first pivot axis may also be transversely shifted. In this manner, it is possible to provide especially long support struts, which may receive a plurality of skis. When the support struts implemented this long have been pivoted into the usage position, they may also have been transversely shifted subsequently or simultaneously with the pivot procedure to position them centrally on the cargo space floor, for example. More flexible positioning of the ski rack is thus also possible, which is advantageous in particular if the skis projecting forward only can or may be guided through an opening in the rear seat row centrally.

For the above-mentioned reasons, in an advantageous embodiment of the cargo space floor according to the invention, the first pivot axis may thus be transversely shifted up to the middle of the cargo space floor.

To allow a space-saving configuration of the ski rack in the nonuse position, without the loading of the cargo space floor with other cargo being obstructed, in a further advantageous embodiment of the cargo space floor according to the invention, a depression is provided in the surface of the cargo space floor in which the ski rack is laid in the nonuse position. The surface of the cargo space floor may be understood here as the surface of the cargo space floor pointing upward, for example, on which the cargo may be placed within the cargo space.

To prevent the cargo positioned on the cargo space floor from being damaged by the ski rack in the nonuse position or vice versa, in a further advantageous embodiment of the cargo space floor according to the invention, a cover is positioned on the cargo space floor, which may be pivoted from a closed position, in which the cover covers the depression, into an open position, in which the depression is accessible. In this manner, the cover provides a collision protection which prevents the ski rack from hitting the cargo and vice versa, even if the ski rack is already in the nonuse position within the depression. To pivot the ski rack from the nonuse position into the usage position, the cover merely has to be pivoted into the open position to subsequently grasp and pivot the ski rack. The cover is preferably also implemented in such a manner that the cover may again be pivoted from the open position into the closed position, even if the ski rack is in the usage position. In this manner, it is ensured that no objects can fall into the now exposed depression. In addition, loading the cargo space floor with other cargo is thus significantly simpler.

To further simplify the loading of the cargo space floor with other cargo, in a further advantageous embodiment of the cargo space floor according to the invention, the cover is positioned flush with the surface of the cargo space floor in the closed position.

In an especially advantageous embodiment of the cargo space floor according to the invention, the section of the depression receiving the ski rack in the nonuse position and/or the cover are implemented as U-shaped. If the depression is implemented as U-shaped, a largely coherent and uninterrupted surface of the cargo space floor is provided. If the cover is U-shaped, a cover having an especially light construction is provided, which may accordingly be pivoted especially easy from the open position into the closed position and vice versa.

According to a further preferred embodiment of the cargo space floor according to the invention, at least one opening in a support strut has a longitudinal direction, in which the inserted ski extends through the opening, a transverse direction, and a vertical direction, a frame which encloses this opening in the vertical and transverse directions extensively, preferably completely, being provided. A frame completely enclosing the opening may thus ensure an especially secure hold of the ski within the opening. The frame may be at least partially moved from a non-receiving position, in which a ski may not be introduced into the opening in the transverse and/or vertical direction, into a receiving position, in which a ski may be introduced into the opening in the transverse and/or vertical direction. The operator must first move the frame from the receiving position into the non-receiving position to subsequently introduce the ski into the opening in the transverse and/or vertical direction. Subsequently, the frame may be moved back into the non-receiving position, in which the ski is fastened securely in the opening within the frame. In this embodiment, it is accordingly not necessary to insert the ski into the opening in the longitudinal direction of the opening, which results in problems in particular if a larger binding is provided on the ski.

In a further preferred embodiment of the cargo space floor according to the invention, the frame has at least one first frame section, which may be pivoted from the non-receiving position into the receiving position and vice versa. The measure of implementing the first frame section as a pivotable part has the advantage that the handling is simplified further in relation to a translationally displaceable first frame part.

To allow secure reception of the ski within the first frame section, the first frame section is formed in a further advantageous embodiment of the cargo space floor according to the invention by an essentially U-shaped profile element which encloses the opening.

According to a further advantageous embodiment of the cargo space floor according to the invention, the frame also has a second frame section, which closes the opening in the U-shaped profile element in the non-receiving position of the first frame section in the transverse and/or vertical directions. The second frame section may thus be implemented in one piece with the associated support strut and/or as a part thereof, for example. Only the first frame section is then implemented as a separate part movable in relation to the second frame section. The second frame section prevents the ski from falling or jumping out of the U-shaped profile element of the first frame section.

To ensure secure support of the ski within the opening, in a further advantageous embodiment of the cargo space floor according to the invention, raised support means for supporting the introduced ski are positioned on the side of the frame facing toward the opening. Support means of this type may prevent damage to the frame on one hand and damage to the ski on the other hand.

To be able to prevent damage to the ski within the opening reliably, the support means are implemented as softer and/or more elastic than the frame in a further advantageous embodiment of the cargo space floor according to the invention In a further advantageous embodiment of the cargo space floor according to the invention, the support means are implemented and positioned in such a manner that the introduced ski may be supported on the bottom on the support means in the transverse direction and at least in the vertical direction. Thus, a support of the introduced ski in the vertical direction upward on the support means is to be possible, but positioning or implementing the support means according to this embodiment is especially important, because the introduced ski must be supported on the bottom on the frame in the transverse direction and in the vertical direction during transport in any case.

According to a further advantageous embodiment of the cargo space floor according to the invention, two ski racks of the type cited are positioned on the cargo space floor, whose pivot axes are positioned parallel to one another and which are pivotable in opposite directions from the nonuse position into the usage position. The operator may decide on only one or both ski racks depending on the number of skis to be transported. The space-saving construction of the two ski racks allows usage of two ski racks at once without further measures.

The motor vehicle according to the invention has a cargo space floor of the type according to an embodiment of the invention, the cargo space floor being able to be pulled from a stowed position within the motor vehicle through an opening of the motor vehicle into a loading position, in which the cargo space floor is positioned at least partially outside the motor vehicle. The opening of the motor vehicle may be the rear opening of the motor vehicle, for example. The handling and also the loading of the ski rack provided on the cargo space floor is made even simpler because the cargo space floor may be pulled into the loading position, in which it is positioned at least partially outside the motor vehicle.

In a preferred embodiment of the motor vehicle according to the invention, the first pivot axis of the ski rack extends in the extension direction of the cargo space floor. In this manner, at least one of the two support struts of the ski rack is reachable especially easily, so that the ski rack may be pivoted into the predetermined positions without the operator having to lean into the cargo space.

BRIEF DESCRIPTION OF THE DRAWINGS

The present invention will hereinafter be described in conjunction with the following drawing figures, wherein like numerals denote like elements.

FIG. 5 shows a partial cross-sectional view of a support strut from FIG. 1 through FIG. 4 in the area of the opening with the first frame section in a non-receiving position; and FIG. 6 shows the partial cross-sectional view from FIG. 5 with the first frame section in the receiving position.

DETAILED DESCRIPTION

Figure 1:
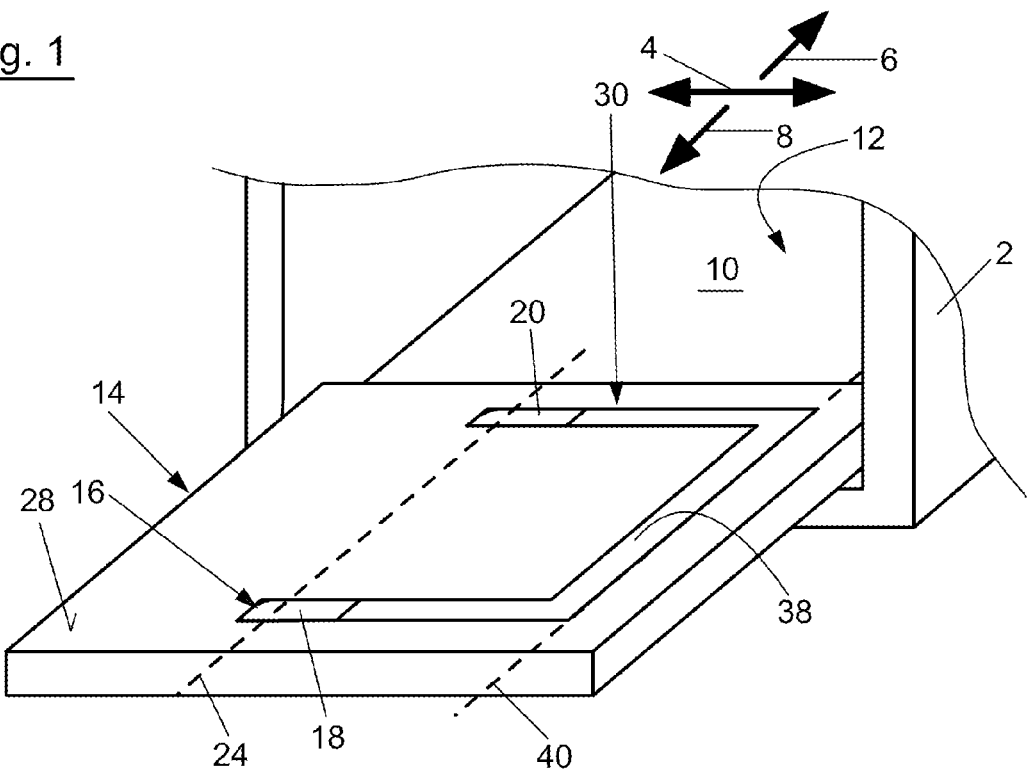
FIG. 1 shows a perspective rear view of a motor vehicle having an embodiment of the cargo space floor according to the invention with the ski rack in the nonuse position and the cover in the closed position.

The following detailed description is merely exemplary in nature and is not intended to limit the invention or application and uses. Furthermore, there is no intention to be bound by any theory presented in the preceding background and summary or the following detailed description.

FIG. 1 through FIG. 4 show a perspective rear view of a motor vehicle, of which only the motor vehicle rear 2 may be seen. The transverse directions 4 of the motor vehicle are indicated by the double arrow, while the forward direction is indicated by the arrow 6 and the backward direction by the arrow 8. A cargo space 10 is provided in the motor vehicle rear 2, which is accessible via a rear opening 12 pointing in the backward direction 8.

An essentially plate-shaped cargo space floor 14 is positioned in the cargo space 10, which may be displaced and/or pulled in the forward direction 6 and in the backward direction 8. The cargo space floor 14 may be pulled from a stowed position, in which the cargo space floor 14 is located completely inside the cargo space 10, through the rear opening 12 of the motor vehicle in the backward direction 8, which is also referred to as the extension direction, into a loading position, which is shown in FIG. 1 through FIG. 4. The cargo space floor 14 is positioned at least partially outside the cargo space 10 of the motor vehicle in the loading position.

Figure 4:
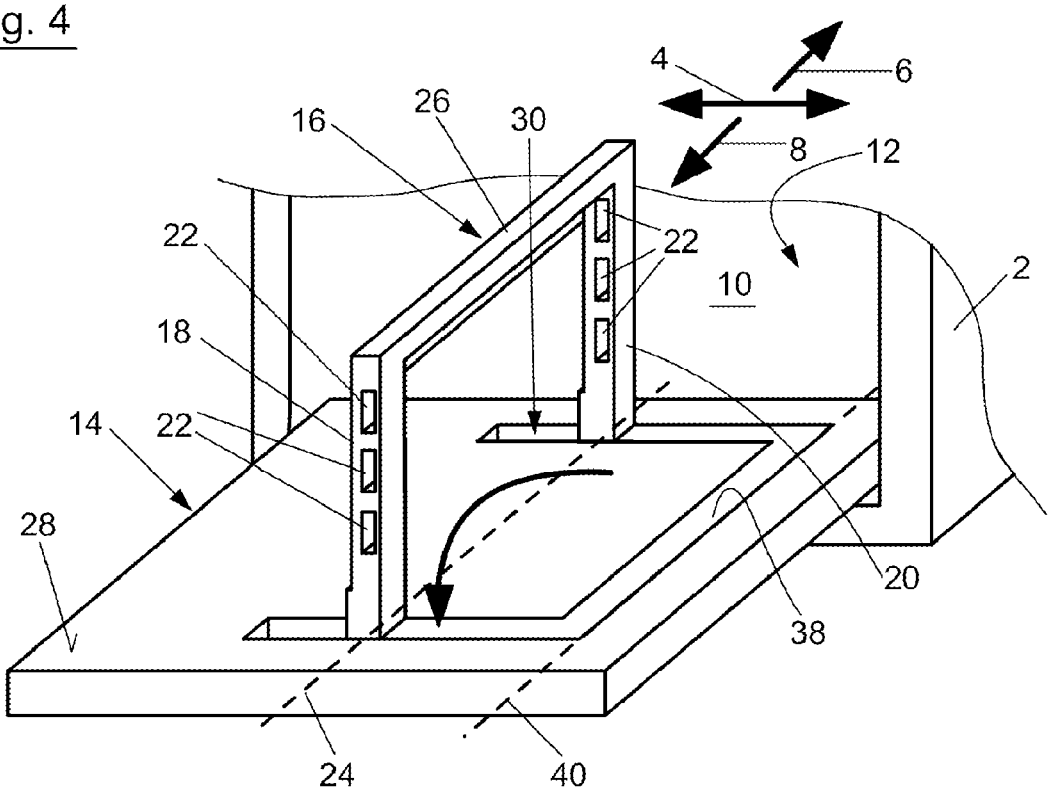
FIG. 4 shows the motor vehicle from FIG. 3 with the cover pivoted back into the closed position.

A ski rack 16 is positioned on the cargo space floor 14, which may be seen especially well in FIG. 4. The ski rack 16 is essentially composed of a first support strut 18 and a second support strut 20, which are spaced apart from one another in the forward and/or backward directions 6, 8 and have openings 22 for receiving a ski (not shown) aligned with one another in the forward and/or backward directions 6, 8. The construction of the support struts 18, 20 in the area of the openings 22 is discussed in greater detail later with reference to FIG. 5 and FIG. 6. The two support struts 18, 20 have ends on the cargo space floor side, which may be pivoted around a joint first pivot axis 24, which extends in the forward and/or backward directions 6, 8 and thus in the extension direction of the cargo space floor 14. The ski rack 16 is positioned on the cargo space floor 14 in such a manner that the first pivot axis 24 may be transversely displaced in the transverse directions 4. In the present example, the first pivot axis 24 and thus the ski rack 16 may be transversely displaced up to the middle of the cargo space floor 14 in relation to the transverse directions 4, as will be explained in greater detail later.

Furthermore, the ski rack 16 comprises a connection strut 26 connecting the first support strut 18 to the second support strut 20. The connection strut 26 is fastened and/or positioned on the ends of the support struts 18, 20 facing away from the first pivot axis 24, so that the support struts 18, 20 are implemented as essentially U-shaped jointly with the connection strut 26. Thanks to the connection strut 26, the pivot movements of the first support strut 18 and the second support strut 20 around the first pivot axis 24 are coupled to one another.

Figure 3:
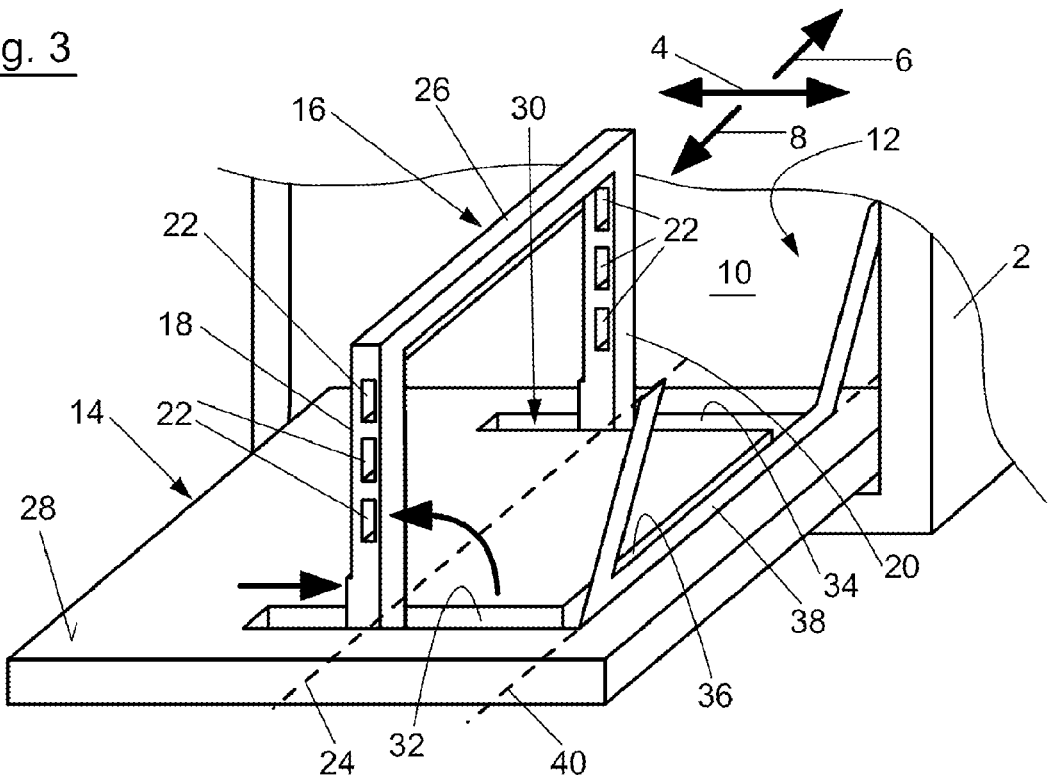
FIG. 3 shows the motor vehicle from FIG. 2 with the ski rack in the usage position.

Furthermore, a U-shaped depression 34 is provided in the surface 28 of the cargo space floor 14 pointing upward, which may be seen in particular in FIG. 3. The U-shaped depression 30 thus comprises two parallel depression sections 32, 34, spaced apart from one another in the forward and/or backward direction 6, 8 and extending in the transverse direction 4, in which the support struts 18, 20 are receivable. In addition, the two depression sections 32, 34 are connected at the end via a depression section 36 extending in the forward and/or backward direction 6, 8, which is used to receive the connection strut 26. The depression 30 is dimensioned in such a manner that the ski rack 16 may be received therein and/or inserted in the nonuse position, as will be explained in greater detail later.

Figure 2:
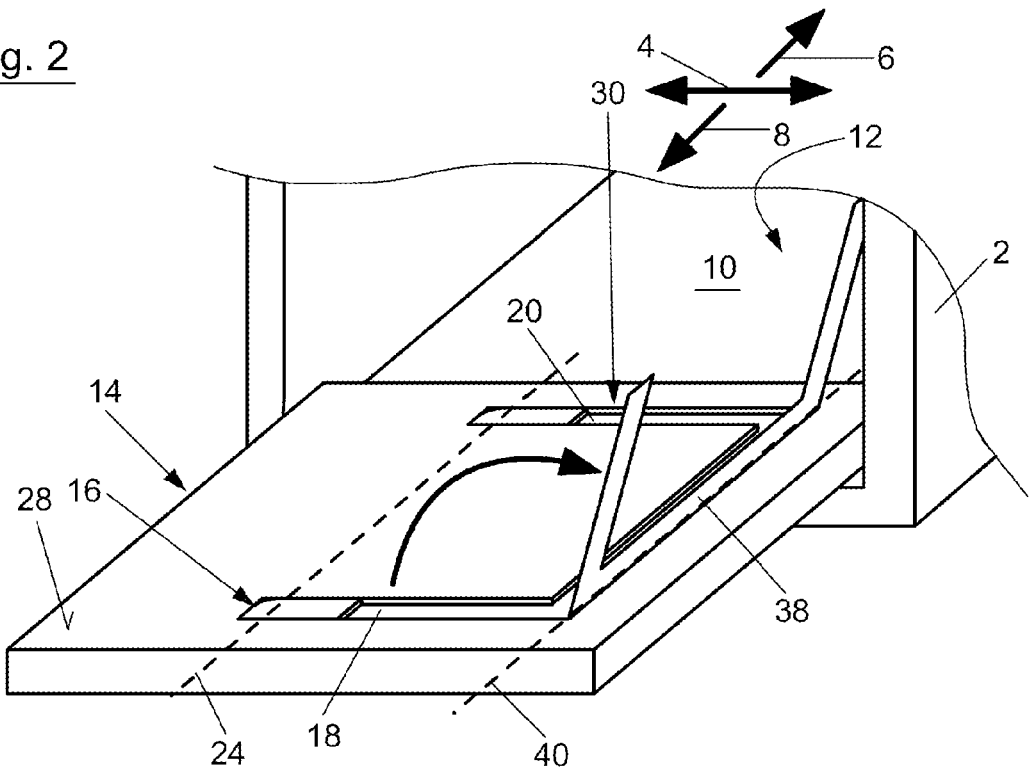
FIG. 2 shows the motor vehicle from FIG. 1 with the cover in the open position.

Furthermore, a cover 38 is provided on the cargo space floor 14, which may be seen particularly well in FIG. 2. The cover 38 is implemented as U-shaped in such a manner that the individual cover sections (no reference number) may cover the depression sections 32, 34, 36. The cover 38 may be pivoted around a second pivot axis 40 on the cargo space floor side from a closed position in which the cover 38 covers the depression 30 into an open position in which the depression 30 is accessible.

The mode of operation and further features of the cargo space floor 14 are described with reference to FIG. 1 through FIG. 4 hereafter.

If an operator wants to introduce one or more skis into the cargo space 10 of the motor vehicle, this is performed as follows. Firstly, the cargo space floor 14 is pulled from the stowed position in the backward direction 8 through the rear opening 12 into the loading position shown in FIG. 1. As is obvious from FIG. 1, the ski rack 16 is located in a lower nonuse position. The ski rack 16 lies in the depression 30 in this nonuse position, and the cover 38 is pivoted around the second pivot axis 40 into the closed position, in which the cover 38 covers the depression 30 together with the ski rack 16 located therein and is positioned flush with the surface 28 of the cargo space floor 14.

As is obvious from FIG. 2, firstly the cover 38 must be pivoted from the closed position of FIG. 1 around the second pivot axis 40 into the open position, so that the depression 30 and thus the ski rack 16 inserted in the depression 30 are accessible.

Subsequently, the ski rack 16 may be grasped to pivot it from the lower nonuse position, which is shown in FIG. 2, around the first pivot axis 24 into an upper usage position, which is shown in FIG. 3. As the ski rack 16 is pivoted into the usage position of FIG. 3, the ski rack 16 and/or its first pivot axis 24 may simultaneously be transversely displaced in the transverse direction 4 toward the middle of the cargo space floor 14. In the usage position of the ski rack 16, its support struts 18, 20 extend essentially in the vertical direction.

The cover 38 may subsequently be pivoted back from the open position shown in FIG. 3 around the second pivot axis 40 into the closed position again, which is shown in FIG. 4, to at least partially close the depression 30 again.

In the usage position of the ski rack 16 from FIG. 4, skis may now be fastened to the ski rack 16, in that they are each introduced into the openings 22 of the first and second support struts 18, 20 aligned with one another. To simplify the introduction of a ski into the associated openings 22 of the two support struts 18, 20, the support struts 18, 20 have a special construction in the area of the openings 22, which is described hereafter with reference to FIG. 5 and FIG. 6.

The opening 22 in the support struts 18, 20 is a continuous opening and has a longitudinal direction 42, in which the introduced ski extends through the opening 22, a transverse direction 44, which is indicated by a double arrow in FIG. 5, and a vertical direction 46, which is also indicated by a double arrow. The transverse direction 44 of the opening 22 corresponds in the present case to the transverse direction 4 of the motor vehicle, while the longitudinal direction 42 of the opening 22 corresponds to the forward and/or backward direction 6, 8 of the motor vehicle.

The opening 22 is completely enclosed in the vertical direction 46 and in the transverse direction 44 by a frame 48 enclosing the opening 22. The frame 48 is composed of a first frame section 50 and a second frame section 52. While the first frame section 50 is formed by an essentially U-shaped profile element enclosing the opening 22 on the bottom in the transverse direction 44 and in the vertical direction 46, the second frame section 52 is provided as a part implemented in one piece with the support struts 18, 20. Raised support means 54 for supporting the introduced ski (not shown) are positioned on the side of the frame 48 or of the first frame section 50 facing toward the opening 22. The support means 54, which are implemented as softer and more elastic than the first frame section 50, are positioned in such a manner that a ski inserted into the opening 22 may be supported on the bottom on the support means 54 in the transverse direction 44 and the vertical direction 46, without hitting the first frame section 50.

The first frame section 50 is linked to the support struts 18, 20 via a third pivot axis 56, which extends in the longitudinal direction 42. Thus, FIG. 5 shows the first frame section 50 in a non-receiving position, in which a ski may not be introduced into the opening 22 in the transverse direction 44 or in the vertical direction 46, because the second frame section 52 closes the opening 22 in the U-shaped profile element, which the first frame section 50 implements, in the transverse and vertical directions 44, 46 in the non-receiving position.

If the operator wants to introduce a ski into the opening 22 in the transverse and/or vertical direction 44, 46, he only has to pivot the first frame section 50 from the non-receiving position from FIG. 2 around the third pivot axis 56 into the receiving position shown in FIG. 6. As is obvious from FIG. 6, the opening 22 within the first frame section 50 is no longer closed by the second frame section 52 in the receiving position of the first frame section 50, so that a ski may now be introduced into the opening 22 in the transverse or vertical direction 44, 46. Subsequently, the first frame section 50 only has to be pivoted around the third pivot axis 56 from the receiving position of FIG. 6 back into the non-receiving position of FIG. 5 to achieve secure fastening of the ski within the opening 22. The special design of the support struts 18, 20 in the area of the openings 22 thus also ensures especially simple and rapid fastening of the ski to the ski rack 16.

In an alternative embodiment to the embodiment from FIG. 1 through FIG. 6, two or more ski racks of the type cited may also be positioned on the cargo space floor 14. In this case, the pivot axes 24 of the ski racks 16 are to be positioned parallel to one another. This is also advantageous if the two ski racks 16 may be pivoted in opposite directions from the non-use position into the usage position.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A cargo space floor assembly for a motor vehicle, comprising:
    a cargo space floor having a depression formed therein, the depression having a first depression section and a second depression section; and
    a ski rack being positioned on the cargo space floor, the ski rack being pivotable from a lower nonuse position around a first pivot axis into an upper usage position in which a ski may be fastened to the ski rack,
    the ski rack comprising
        a first support strut positioned in the first depression section in the lower nonuse position and rotated out of the first depression section in the upper usage position;

a second support strut spaced apart from the first support strut and positioned in the second depression section in the lower nonuse position and rotated out of the second depression section in the upper usage position, wherein the first pivot axis is transversely displaceable along the first depression section and the second depression section; and a plurality of openings within the first support strut and the second support strut that are aligned with one another for receiving the ski.

2. The cargo space floor assembly according to claim 1, wherein movements of the first support strut and the second support strut are configured to pivot about the first pivot axis coupled to one another.

3. The cargo space floor assembly according to claim 1, wherein the first pivot axis is transversely displaceable up to the middle of the cargo space floor.

4. The cargo space floor assembly according to claim 1, wherein the ski is a first ski, wherein the plurality of openings includes a first set of openings for receiving the first ski and a second set of openings for receiving a second ski, and wherein the cargo space floor assembly further includes a first frame positioned in at least one of the first set of openings and a second frame positioned in at least one of the second set of openings, wherein the first frame is configured to rotate about a second pivot axis, different from the first pivot axis.

5. The cargo space floor assembly according to claim 4, wherein the second frame is configured to rotate about a third pivot axis, different from the first and second pivot axis.

6. The cargo space floor assembly according to claim 1, wherein a cover is positioned on the cargo space floor, which is pivotable from a closed position, in which the cover covers the depression, into an open position, in which the depression is accessible.

7. The cargo space floor assembly according to claim 6, wherein the cover is positioned flush with the surface of the cargo space floor in the closed position.

8. The cargo space floor assembly according to claim 6, wherein at least one of a section of the depression or the cover receiving the ski rack in the lower nonuse position are implemented as U-shaped.

9. The cargo space floor assembly according to claim 1, wherein the first support strut and the second support strut are connected to one another via a connection strut.

10. The cargo space floor assembly according to claim 9, wherein the first support strut and the second support strut are implemented as essentially U-shaped jointly with the connection strut.

11. The cargo space floor assembly according to claim 10, wherein the connection strut is fastened to ends of the first support strut and the second support strut facing away from the first pivot axis.

12. The cargo space floor assembly according to claim 1, wherein at least one opening has a longitudinal direction, in which the ski extends through the opening, a transverse direction, and a vertical direction, and a frame extensively enclosing the opening in the vertical and transverse directions, the frame being at least partially movable from a non-receiving position, in which the ski may not be introduced in at least one of the transverse direction or the vertical direction into a recess, into a receiving position, in which the ski may be introduced in at least one of the transverse direction or the vertical direction into the opening.

13. The cargo space floor assembly according to claim 12, wherein the frame has a first frame section, which is pivotable from the non-receiving position into the receiving position.

14. The cargo space floor assembly according to claim 13, wherein the first frame section is formed by an essentially U-shaped profile element which encloses the opening.

15. The cargo space floor assembly according to claim 14, wherein the frame also has a second frame section, which closes the opening in a U-shaped profile element in the transverse and/or vertical directions in the non-receiving position of the first frame section.

16. The cargo space floor assembly according to claim 12, wherein a raised support for supporting the ski is positioned on a side of the frame facing toward the opening.

17. The cargo space floor assembly according to claim 16, wherein the raised support is softer as compared to the frame.

18. The cargo space floor assembly according to claim 16, wherein the raised support is implemented in such a manner that the ski may be supported on the bottom on the raised support in the transverse direction and at least in the vertical direction.

* * * * *